United States Patent
Kamisetty et al.

(10) Patent No.: US 9,178,846 B1
(45) Date of Patent: Nov. 3, 2015

(54) DETERMINISTIC NETWORK ADDRESS AND PORT TRANSLATION

(75) Inventors: Sarat Kamisetty, Fremont, CA (US);
Rajesh Mohan, Cupertino, CA (US);
Suresh Kumar Vinapamula Venkata, Sunnyvale, CA (US); Reinaldo Penno, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 992 days.

(21) Appl. No.: 13/326,903

(22) Filed: Dec. 15, 2011

Related U.S. Application Data

(60) Provisional application No. 61/556,003, filed on Nov. 4, 2011.

(51) Int. Cl.
*H04L 29/12* (2006.01)

(52) U.S. Cl.
CPC ............. *H04L 61/10* (2013.01); *H04L 61/256* (2013.01)

(58) Field of Classification Search
CPC .............................. H04L 67/10; H04L 61/256
See application file for complete search history.

(56) References Cited

U.S. PATENT DOCUMENTS

| | | | |
|---|---|---|---|
| 6,006,269 A | 12/1999 | Phaal | |
| 6,571,287 B1 | 5/2003 | Knight et al. | |
| 6,687,245 B2 | 2/2004 | Fangman et al. | |
| 7,058,973 B1 | 6/2006 | Sultan | |
| 7,184,437 B1 | 2/2007 | Cole et al. | |
| 7,194,767 B1 | 3/2007 | Boydstun et al. | |
| 7,346,044 B1 | 3/2008 | Chou et al. | |
| 7,624,195 B1 | 11/2009 | Biswas et al. | |
| 8,259,571 B1 | 9/2012 | Raphel et al. | |
| 8,274,979 B2 | 9/2012 | Bragagnini et al. | |
| 8,458,338 B2 | 6/2013 | Karino et al. | |
| 8,553,542 B1 | 10/2013 | Szabo et al. | |
| 8,656,052 B2 | 2/2014 | Carothers | |
| 8,891,540 B2 | 11/2014 | Krishna et al. | |
| 2002/0138622 A1 | 9/2002 | Dorenbosch et al. | |
| 2006/0029081 A1 | 2/2006 | Yan et al. | |
| 2006/0248581 A1 | 11/2006 | Sundarrajan et al. | |
| 2007/0043876 A1 | 2/2007 | Varga et al. | |
| 2007/0162968 A1 | 7/2007 | Ferreira et al. | |
| 2008/0013524 A1 | 1/2008 | Hwang et al. | |

(Continued)

FOREIGN PATENT DOCUMENTS

JP 4705656 B2 6/2011

OTHER PUBLICATIONS

Gont, "TCP's reaction to soft errors," RFC 5461, Feb. 2009, 12 pp.

(Continued)

*Primary Examiner* — Angela Nguyen
(74) *Attorney, Agent, or Firm* — Shumaker & Sieffert, P.A.

(57) ABSTRACT

A source network address and port translation (NAPT) mechanism is described that reduces or eliminates the need to log any NAT translations. As described herein, a mapping between a subscriber's private address to a public address and port range is determined algorithmically. Given a particular mapping rule, as specified by the service provider, a subscriber is repeatedly and deterministically mapped to the same public network address and a specific port range for that network address. Once the public address and port range for a subscriber are computed, the particular ports for each session for that subscriber are allocated dynamically within the computed NAT port range on per session basis.

22 Claims, 4 Drawing Sheets

(56) References Cited

U.S. PATENT DOCUMENTS

| | | |
|---|---|---|
| 2008/0044181 A1 | 2/2008 | Sindhu |
| 2008/0107112 A1 | 5/2008 | Kuo et al. |
| 2009/0109983 A1 | 4/2009 | Dixon et al. |
| 2009/0129301 A1 | 5/2009 | Belimpasakis |
| 2009/0135837 A1 | 5/2009 | Mohaban |
| 2010/0008260 A1 | 1/2010 | Kim et al. |
| 2010/0153560 A1 | 6/2010 | Capone et al. |
| 2010/0175123 A1 | 7/2010 | Karino et al. |
| 2010/0214959 A1 | 8/2010 | Kuehnel et al. |
| 2011/0047256 A1* | 2/2011 | Babu et al. .................... 709/223 |
| 2011/0196945 A1 | 8/2011 | Alkhatib et al. |
| 2011/0219123 A1 | 9/2011 | Yang et al. |
| 2011/0249682 A1 | 10/2011 | Kean et al. |
| 2012/0023257 A1 | 1/2012 | Vos et al. |
| 2012/0110194 A1 | 5/2012 | Kikkawa et al. |
| 2013/0054762 A1 | 2/2013 | Asveren |
| 2013/0067110 A1 | 3/2013 | Sarawat et al. |
| 2013/0091303 A1 | 4/2013 | Mitra et al. |
| 2013/0103904 A1 | 4/2013 | Pangborn et al. |
| 2013/0166763 A1 | 6/2013 | Forsback |

OTHER PUBLICATIONS

U.S. Appl. No. 13/172,556, filed Jun. 29, 2011 entitled Mobile Gateway Having Decentralized Control Plane for Anchoring Subscriber Sessions.

U.S. Appl. No. 61/054,692, filed May 20, 2008 entitled Streamlined Packet Forwarding Using Dynamic Filters for Routing and Security in a Shared Forwarding Plane.

Donley et al. "Deterministic Address Mapping to Reduce Logging in Carrier Grade NATs draft-donley-behave-deterministic-cgn—00" Network Working Group, Internet-Draft, IETF Trust, Sep. 26, 2011, 10 pgs.

Diel et al., "Characterizing TCP Resets in Established Connections," Computer Science Department Technical Report, Sep. 10, 2008, 10 pp.

Nilsson et al., "Fast Address Lookup for Internet Routers," Proceedings of Algorithms and Experiments, Feb. 9-11, 1998, pp. 9-18.

Penno et al., "Network Address Translation (NAT) Behavioral Updates," Internet-draft update: 4787-5382-5508, draft-penno-behave-rfc4787-5382-5508-bis-02, Nov. 16, 2011, 11 pp.

* cited by examiner

DETERMINISTIC NETWORK ADDRESS AND PORT TRANSLATION

The application claims the benefit of U.S. Provisional Patent Application No. 61/556,003, filed Nov. 4, 2011, the entire contents of which are incorporated herein by reference.

TECHNICAL FIELD

The invention relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to the subscriber equipment (e.g., cable modems, DLS modems, mobile devices) utilized by their customers. For example, a DHCP server or Radius server may dynamically assign a private address to a subscriber equipment upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by each subscriber equipment to public network addresses that are routable within a public network, such as the Internet.

Service providers are often required to be able to identify a particular customer that is associated with particular network traffic. For example, service provides are typically required to maintain information such that any give network address that sourced or received certain traffic can be traced back to the particular customer. As a result, service providers typically maintain archives of NAT system log files ("syslog"). Each syslog file stores potentially a significant amount of information including the private source IP address, the private source port, any VPN information of the subscriber, tunneling information, any NAT rules/terms, public IP address and port assigned to the subscriber, and the like.

The service providers are typically required to store this information for months or years to meet law enforcement requirements. This can present significant challenges and burdens in certain environments, such as large service provider networks where session setup rate is typically very high with tens of thousands of sessions being established and torn down each day. Generating syslogs with NAT translation information in such an environment, referred to as Carrier Grade NAT (CGN), for each and every session during the setup and teardown consumes resources on the NAT device, network bandwidth and also resources on the servers storing the syslogs.

SUMMARY

In general, techniques for deterministic network address translation (NAT) are described. For example, a source network address and port translation (NAPT) mechanism is described that reduces or even eliminates the need to log NAT translations. As described herein, a mapping between a subscriber's private address to a public address and port range is determined algorithmically. Given a particular mapping rule, as specified by the service provider, a subscriber is repeatedly and deterministically mapped to the same public network address and a specific port range for that network address. Once the public address and port range for a subscriber are computed, the particular ports for each session for that subscriber are allocated dynamically within the computed NAT port range on per session basis.

In addition, given a public network address and specific port, and the particular deterministic NAT rule configuration in use, the techniques algorithmically map that information back to a subscriber's private network address. In other words, the deterministic NAPT techniques described herein are reversible. In this way, if necessary, a subscriber's private address, and therefore identify, can be subsequently determined without needing to maintain voluminous NAT translation logs. Instead, service providers need only store for each deterministic NAT rule a date range in which the rule was used, a range of available private addresses subnets (i.e., the range of the pool of private addresses), and the public address subnets (i.e., the range of the pool of public addresses). The data range may be the date and time of activation and deactivation of the particular mapping rule.

In one embodiment, a method comprises receiving, with a network device, a packet from a subscriber, wherein the packet includes a private source network address and source port, and selecting a network address translation (NAT) rule for the packet. The method further comprises deterministically computing, with the network device, a public network address and a range of ports assigned to the private network address of the packet using the selected NAT rule, and dynamically selecting an unused port from the range of ports. The method further comprises generating a translated packet from the packet, wherein the translated packet includes the computed public network address and the selected unused port from the range of ports in place of the private source address and source port; and forwarding the translated packet from the network device to a public network.

In another embodiment, a network device comprises a plurality of interfaces that send and receive packets for subscribers of a service provider network, and a control unit that provides a user interface for configuring at least one network address (NAT) rule. The network device further includes a NAT controller that, upon receiving a packet for a new subscriber session, deterministically computes a public network address and a range of ports assigned to a private network address of a subscriber based on the NAT rule. The NAT controller dynamically selects an unused port from the range of ports. A forwarding component outputs a translated packet that includes the computed public network address and the selected unused port in place of the private source address and a source port of the packet.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
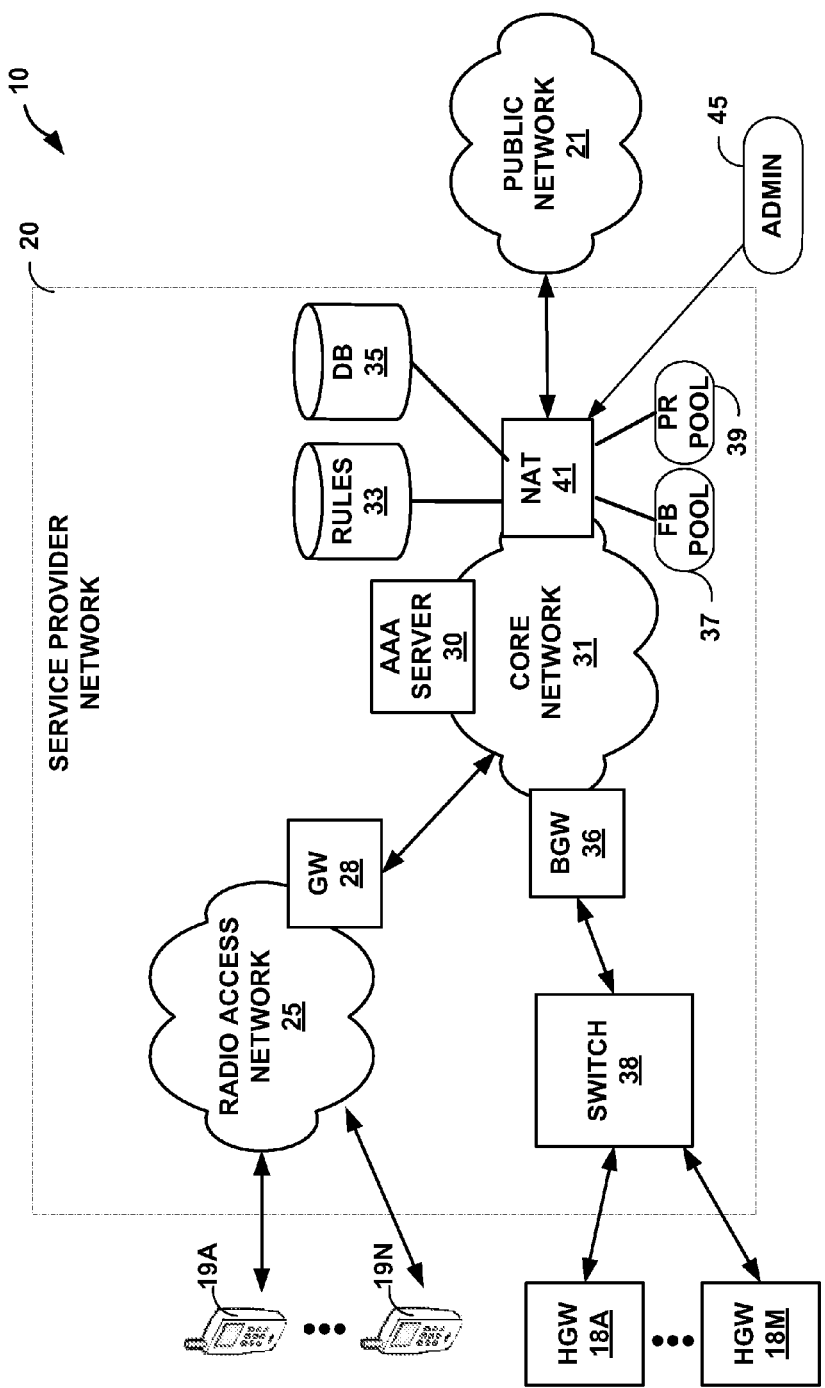
FIG. 1 is a block diagram illustrating an exemplary network system that implements the network address translation techniques described in this disclosure.

FIG. 1 is a block diagram illustrating an exemplary network system 10 that implements the network address translation techniques described in this disclosure. As shown in the example of FIG. 1, network system 10 includes a service provider network 20 and a public network 21. In the example of FIG. 1, service provider network 20 operates as a private network that provides packet-based network access to home gateways ("HGWs") 18A-18M that service endpoint computing devices, such as personal computers, laptop computers or other types of computing device associated with subscribers. In addition, service provider network 20 may provide data services to cellular mobile devices 19A-19N. Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, HGWs 18 connect to a broadband network gateway (BGW) 36 via network switch 38. In one example, HGWs may be DSL modems and network switch 38 may comprise a digital subscriber line access multiplexer (DSLAM) or other switching device. Each of HGWs 18 may utilize a Point-to-Point Protocol (PPP), such as PPP over ATM or PPP over Ethernet (PPPoE), to communicate with network switch 38. For example, using PPP, one of HGWs 18 may request access to core network 31core network 31 and provide login information, such as a username and password, for authentication by AAA server 30. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as cable, Ethernet over a T1, T3 or other access links.

Network switch 38 may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some embodiments, broadband network gateway 36 may comprise a router that maintains routing information between endpoint computing devices 18 and core network 31.

Service provider network 20 may also include radio access network 25 in which one or more base stations communicate via radio signals with mobile devices 19. Radio access network 25 is a transport network that enables base stations to exchange packetized data with core network 31 of the service provider, ultimately for communication with packet data network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28. Core network 31 provides session management, mobility management, and transport services between backhaul network 27 and core network 31 to support access, by mobile devices 19, to public network 21 and services of protected resources 14. Core network 31 may comprise, for instance, a general packet radio service (GPRS) core packed-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials a subscriber requesting a network connection. The AAA server 30 may be integrated within a router or gateway of broadband network or on a separate network device and may be, for example, a Remote Authentication Dial-In User Service (RADIUS) server. Upon authenticating a network access request from either an HGW 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. In some cases, BGW 36 or GW 28 may send a Radius authentication request to AAA server 30 for authentication and assignment of an IP address.

Network address translation (NAT) device 31 provides network address translation for private network addresses routable within service provider network to public network addresses routable within public network 21. As described hereIN, NAT device 41 applies a source network address and port translation (NAPT) mechanism that may reduce or even eliminate the need for the service provider to generate and maintain logs of NAT translations. As described herein, NAT device 41 applies rules 33 for algorithmically mapping between a subscriber's private network address to a public address and port range (i.e., a block of a plurality of contiguous ports). NAT DEVICE 41 provides an interface by which an administrator 45 defines one or more NAT rules 33. NAT DEVICE 41 records scheduling changes (e.g., activation and deactivation times, interfaces) within database 35 with respect to NAT rules 33. For example, upon activation or deactivation of a particular NAT rule 33, NAT device 41 creates an entry within database 35 to specifically record the data and time at which the NAT rule was put into force or removed. If one example, activation of a different one of deterministic NAT rules 33 causes NAT device 41 to recompute the current NAT bindings for existing flows. Given a particular mapping rule, as specified by administrator 45, NAT device 41 repeatedly and deterministically maps the private network address assigned to each subscriber (e.g, each of GW 18 or mobile devices 19) to a corresponding public network address and specific port range.

For example, upon detecting outbound packet from core network 31 destined for a destination address within public network 21, NAT DEVICE 41 accesses rules 33 to select one of the active rules having criteria that match the characteristics of the outbound traffic. NAT DEVICE 41 then applies the selected rule algorithmically to compute a particular public address and port range based on the private source address of the outbound packet. NAT DEVICE 41 then selects a free port from the port range, i.e., a port that is not currently being used to NAT a different communication session for that same private network address. In this way, once the public address and port range for a subscriber are computed, the particular ports for each session for that subscriber are allocated dynamically within the computed NAT port range on per session basis. In the event that no more ports are available within the port range computed for the particular private IP address, NAT DEVICE 41 may utilize an overload pool, as described in further detail below. NAT device 41 may record within database 35 the association between the private address/port and the public address port for the communication session. NAT DEVICE 41 may remove the entries from database 35 upon the communication session being torn down or upon the entries becoming stale.

Upon computing the public address and dynamically selecting a specific port, NAT device 41 performs network address translation to translate the private source network address and source port within the packet to the computed public network address and the assign port number. During this process NAT device 41 may replace all or a portion of a header (e.g., IP or UDP header) of the packet prior to forwarding the packet to public network 21. Upon receiving an inbound packet from public network 21, NAT device 41 access database 35 to identify a current NAT entry for the communication session and maps the public destination network address and the destination port to the corresponding private network address and port. NAT device 41 may then replace all or a portion of a header (e.g., IP or UDP header) within the packet prior to forwarding the packet to core network 31.

The techniques allow a previously used subscriber's private network address to be algorithmically mapped back to a public network address and specific port, given the particular deterministic NAT rule configuration in use at that time. In other words, the deterministic NAPT techniques described herein are reversible. In this way, if necessary, a subscriber's private address, and therefore identify, can be subsequently determined without needing to maintain voluminous NAT translation logs. Instead, database 35 of service provider network 20 need only store, for each deterministic NAT rule, a date range in which the rule was used, a range of available private addresses subnets (i.e., the range of the pool of private addresses) at that time, and the public address subnets (i.e., the range of the pool of public addresses) at that time. Entries within database 35 may specify the data range as the date and time of activation and deactivation of the particular mapping rule.

With this algorithm, the Public IPv4 address and Port range for a given end user are fixed and can be deterministically computed. Once the port range is determined, the allocation of a given port for a new flow is performed dynamically. A port range of at least 2048 ports per subscriber may, for example, easily be supported.

With this method, database 35 need only store entries for activation/deletion of the source-NAT rule including (Date, Private IP subnet, Public IP subnet), i.e., an activation time period specifying when each the NAT rules has been active. This deterministic port range allocation model is compatible with static port forwarding rules by reserving the <X> initial ports of each range for this function.

In one embodiment, NAT device 41 maintains an overload fallback pool ("FB POOL") 37 of ports configured along with the primary pool ("PR POOL") 39 of ports used for deterministic NAT. Initially, an end user will be allocated ports from the primary pool 39 using the deterministic NAT algorithm described herein. If a subscriber runs out of ports from the primary pool 39, then ports from fallback pool 37 will be allocated. That is, if the number of concurrent communication sessions for an individual subscriber exceeds the number of ports within the computed port range, then additional ports are utilized from fallback pool 37. Fallback pool 37 may use the same address range as primary pool 39 or may use a different range of addresses and port range. In one embodiment, instead of allocating individual ports from fallback pool 37, a block of contiguous ports is allocated to a subscriber dynamically and system logs are created upon the creation and deletion of such port blocks, but only for the ports from fallback pool 37. In this way, allocation of ports from fallback pool 37 does not compromise the deterministic nature of the NAT algorithm.

Figure 2:
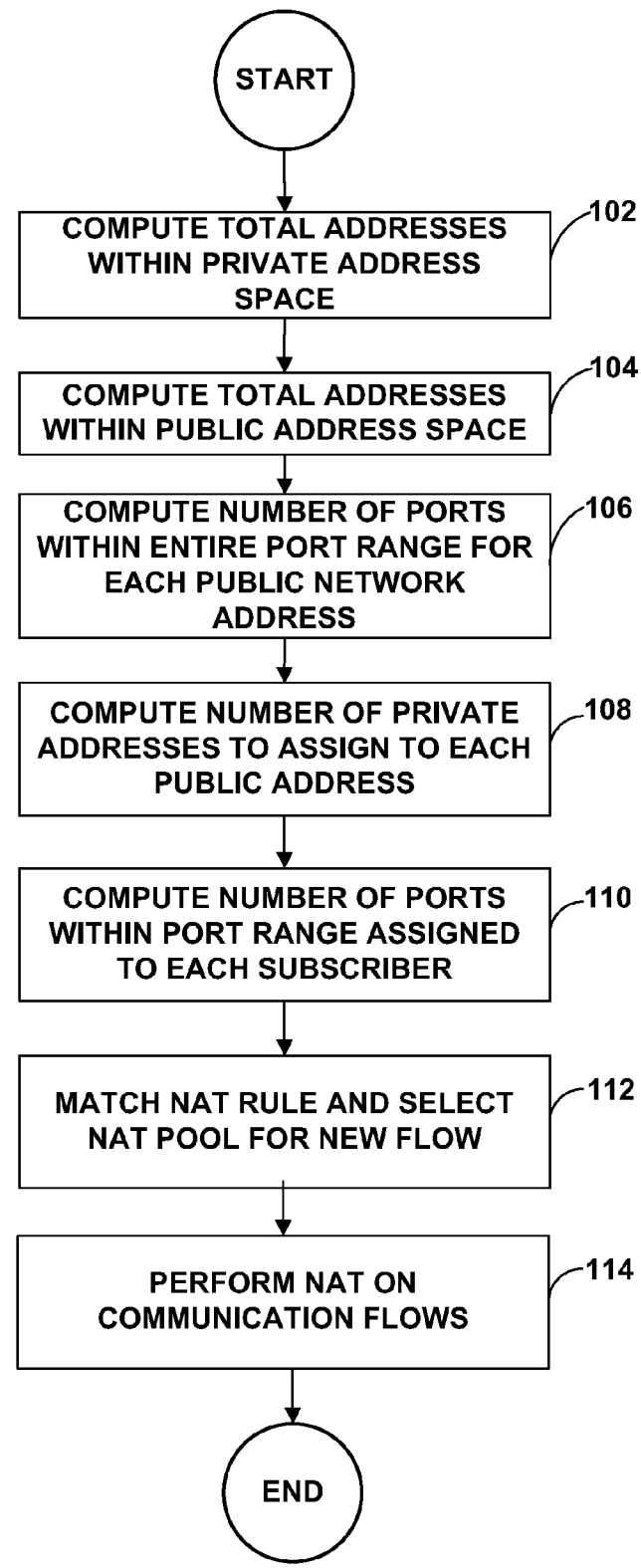
FIG. 2 is a flowchart illustrating an example embodiment of a deterministic network address translation (NAT) technique.

FIG. 2 is a flowchart illustrating an example embodiment of a deterministic network address translation (NAT) technique. The process of FIG. 2 may be invoked for each of NAT rule 33. For example, each NAT rule may include a "from clause" that specifies criteria for matching against a private source address of the packet and may specify multiple address prefixes and/or ranges of private networks to which the rule is to be applied. Similarly, the NATY rule may identify or otherwise correspond to a specific NAT pool and may specify multiple address prefixes and/or multiple address ranges of public addresses. In some embodiments, a user (e.g., administrator 45) is allowed to configure an explicit port range for a given NAT pool. Further, in some cases ports 0 to 1023 by default are reserved and are not allocated for a subscriber unless explicit port range is configured including this reserved port range.

Initially, NAT device 41 computes or otherwise determines for each NAT rule 33 a total number of subscribers (102). This may be computed by counting the numbers of private addresses ("Num-NAT-IPs") configured in all the private source address ranges, prefixes and prefix lists configured in the match condition of the NAT rule. This provides the total private network address space for the NAT rule.

NAT device 41 computes the total number of public IP addresses ("Num-NAT-IPs") available in the NAT rule (104). This may be computed by calculating the total number of NAT addresses in all the prefixes, ranges in the NAT pool (e.g., primary NAT pool 30) configured for the matching NAT rule.

NAT device 41 then computes a number of ports ("Num-Ports-per-NAT-IP") that are available as a contiguous port range for each public network address (106). This may be computed as: Num-Ports-per-NAT-IP=High-port–Low-port+1, where High-port and Low-port are configured in the selected NAT pool for specifying an overall range of contiguous ports for each address. As such, Num-Ports-per-NAT-IP represents the overall port space for each public address with the particular NAT pool.

NAT device 41 then computes a number of private addresses ("Num-Priv-IPs-per-NAT-IP") to assign to each public network address (108). This may be computed as: Num-Priv-IPs-per-NAT-IP=Num-Port-Blocks-per-NAT-IP=roundup(Num-Priv-IPs/Num-Pub-IPs).

NAT device 41 then computes a number of ports ("Num-Ports-per-NAT-IP") in each contiguous port range to be allocated for an individual subscriber for use with a public network address (110). This may be computed as: Port-Block-Size=Num-Ports-per-NAT-IP/Num-Port-Blocks-per-NAT-IP. The information computed in blocks 102-110 may be pre-computed and stored within database 35. In addition, the information may be programmed into forwarding components of NAT device 41.

Upon processing an outbound packet for a new communication session, NAT device 41 matches a NAT rule 33 based on the private source network address or other criteria and selects a NAT pool to use for network address translation (112). NAT device 41 then performs NAT for subscriber communication flows by algorithmically computing a NAT address and port range for the new communication flow using the pre-computed information and dynamically selecting an unused port within the port range (114).

Figure 3:
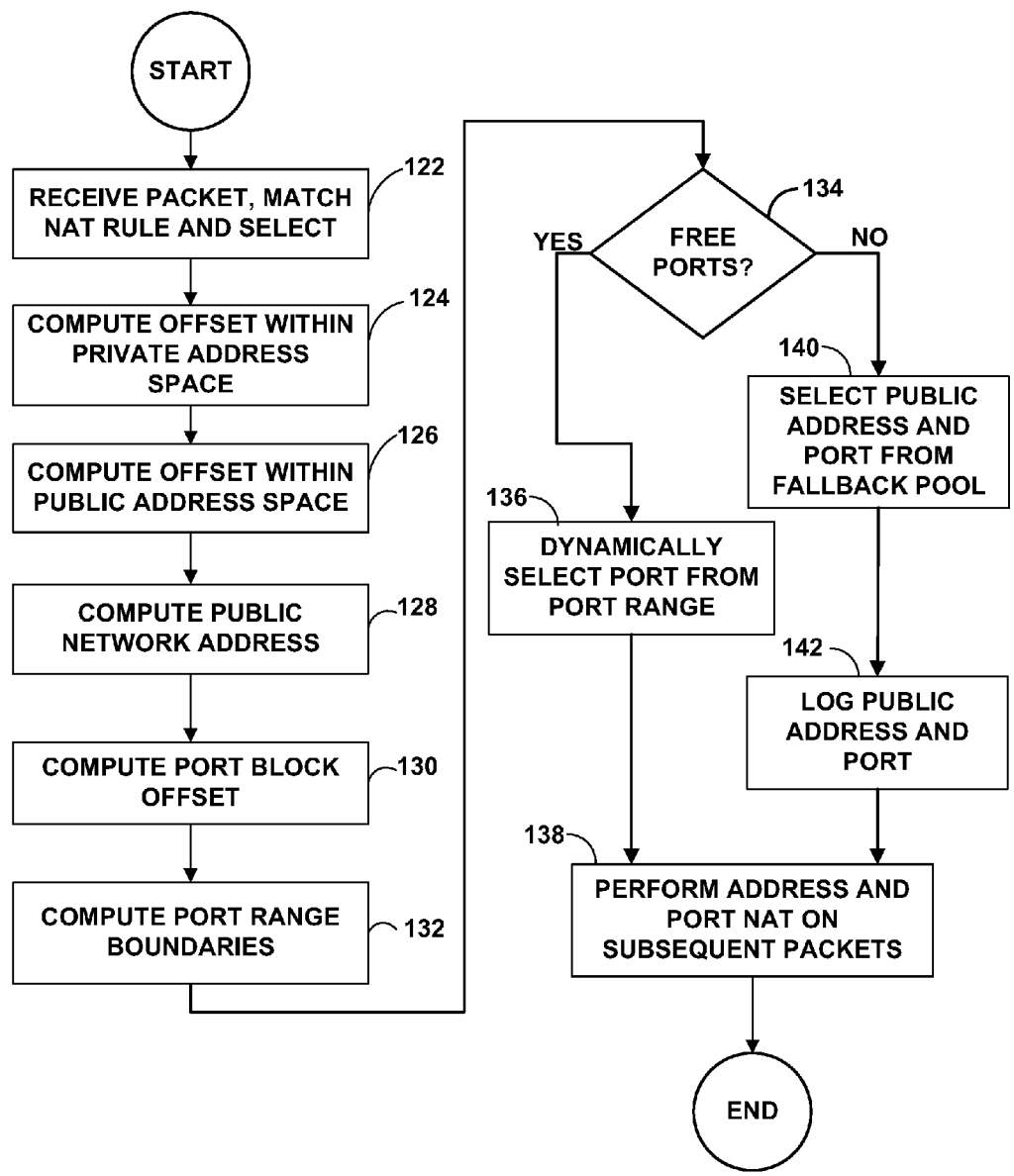
FIG. 3 is a flowchart illustrating in further detail an example process of performing network address translation for a given NAT rule upon detecting a new subscriber session.

FIG. 3 is a flowchart illustrating in further detail an example process of performing network address translation using the information computed in FIG. 2 for a given NAT rule 33. The process of FIG. 3 may be invoked by matching criteria one or more rules (e.g., NAT rules 33) to contents of a packet for a new communication session (122). For example, each NAT rule may include a "from clause" that specifies criteria for matching against a private source address of the packet.

NAT device 41 may first compute a private address offset ("Priv-IP-offset") for the specific private source address within the packet (124). This offset is computed across all the prefixes and ranges of private addresses for the matched NAT rule, assuming all the addresses are adjacent to each other. The private address offset represents the position of the particular subscriber's private network address, as specified as the source address within the outbound packet, within the overall private address space available to the matching NAT rule.

NAT device 41 then computes a public address offset ("NAT-IP-offset") that cross all the prefixes and ranges of public addresses for the matched NAT rule, assuming all the addresses are adjacent to each other (126). The public address offset represents the position to which the particular subscriber's private network address will be mapped within the overall public address space available to the matching NAT rule. This may be computed as follows: NAT-IP-offset=Priv-IP-offset % Num-NAT-IPs, where % represents a modulo operation.

NAT device 41 then computes the public network address ("Allocated-NAT-IP") to be used for the new communication flow from the subscriber (128). This may be computed as follows: Allocated-NAT-IP=Base-Public-IP+NAT-IP-offset, where "Base-Public-IP" represents a starting (lowest) public network address within the pool of available network addresses for the NAT rule.

NAT device 41 similarly computes a port block offset ("Port-block-offset"), which represents the block offset (e.g., a block number out of the total number of port blocks) for the block of ports for this particular subscriber within the overall number of blocks for the public address (130). This may be computed as follows:

Port-block-offset=Priv-IP-offset/Num-NAT-IPs,

Next, NAT device 41 computes the port boundaries for the subscriber based on the port block offset ("Port-block-offset") (132). For example, NAT device 41 may compute the highest port ("High-port-of-port-range") and the lowest port ("Low-port-of-port-range") for this port range. These boundaries of the port range may be computed as follows: Low-port-of-port-range=Low-Port+(Port-Block-Size*Port-block-offset) and High-port-of-port-range=Low-port-of-port-range+Port-Block-Size−1.

At this point, the computed information of Allocated-NAT-IP: [Low-port-of-port-range, High-port-of-port-range] represents the subscriber with the private address Priv-IP of the outbound packet for the newly detected flow. Using this information, NAT device 41 attempts to dynamically assign a port within the calculated port range for the subscriber. Initially, NAT device 41 determines whether any free ports within the port range exist or whether the ports are currently being used for other flows of the subscriber (134). In the event at least one free port exists within the computed port range, NAT device 41 assigns that port for use with the newly detected communication flow (136). At this time NAT device 41 may update forwarding hardware or database 35 with the NAT mapping information for use with the current communication session. NAT device 41 uses the computed public network address and dynamically selected port for performing NAT for packets of the new communication session (138). In this way, no system logs need be generated as the individual subscriber may subsequently be determined from the public network address/port combination in view of the matching NAT rule 33 that was active at the time of the communication flow.

In the event no more free ports exist in the port range computed for the current flow of the subscriber (no of 134), NAT device 41 selects a public IP address and port from fallback pool 37 (140). That is, if the number of concurrent communication sessions for an individual subscriber exceeds the number of ports within the computed port range, then additional public addresses and ports are utilized from fallback pool 37. NAT device 41 may create a system log upon resorting to the user of fallback pool 37 to log the particular public address and port used for the communication flow of the subscriber (142). In this way, system logs may need to be generated only for rare overflow situations, thereby reducing or even potentially eliminating the need to generate and archive system logs.

Figure 4:
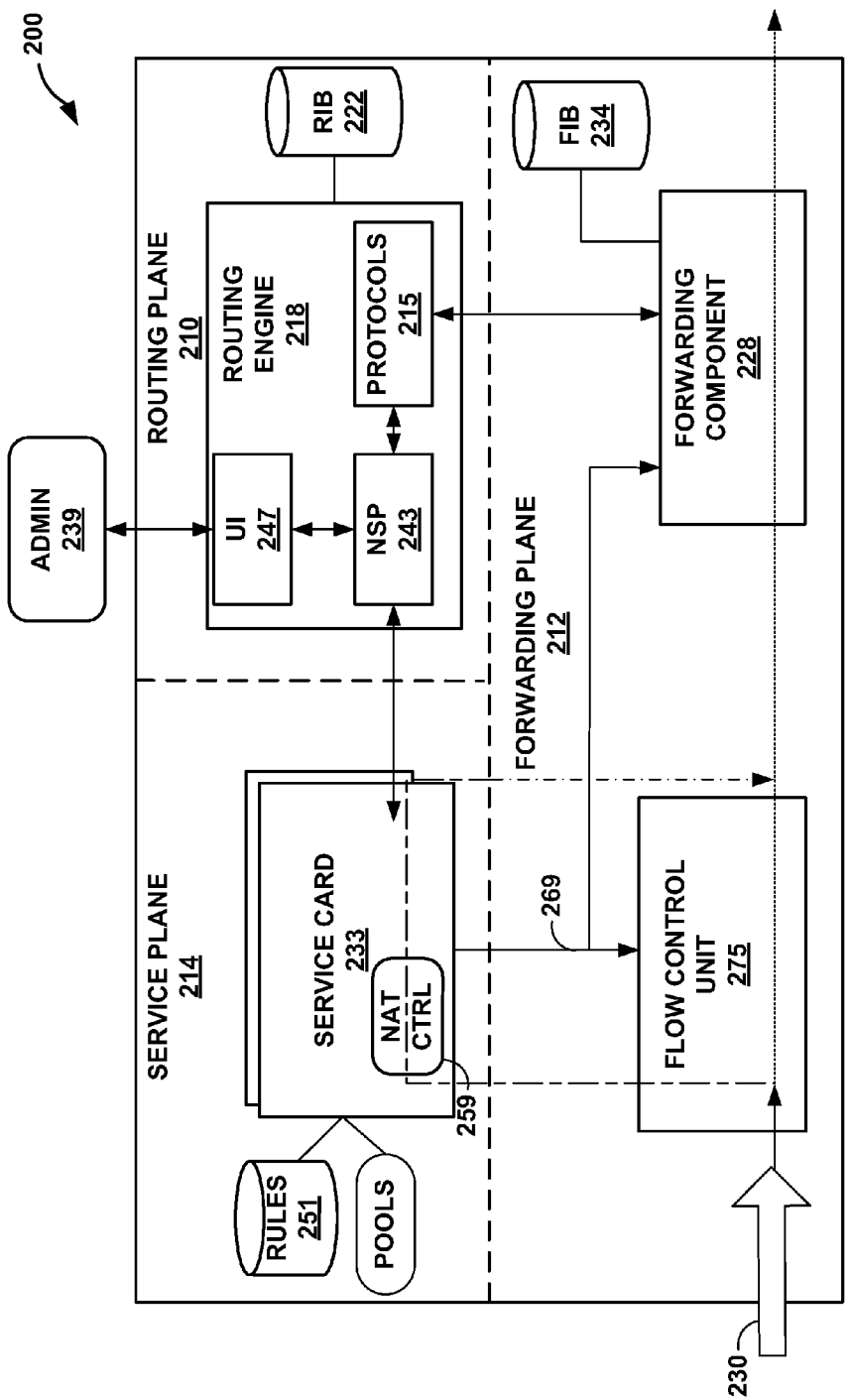
FIG. 4 illustrates an example network device that incorporates the NAT functions described herein.

FIG. 4 illustrates an example network device 200 that incorporates the NAT functions described herein. In this example, network device 200 may be a standalone device or a router or gateway device, such as BGW 36 or GW 28 of FIG. 1. Network device 200 may perform the functions described above with respect to NAT device 41 of FIGS. 1-3. As such example, network device 200 may, for example, be a high-end router or gateway capable of deployment within a service provider network.

In the example of FIG. 4, the components of network device 200 may be logically organized into a routing plane 210, a forwarding plane 212 and a service plane 214. Routing plane 210 provides a routing engine 218 that is primarily responsible for maintaining a routing information base (RIB) 222 to reflect the current topology of a network and other network entities to which network device 200 is connected. For example, routing engine 218 provides an operating environment for execution of routing protocols 215 that communicate with peer routers and periodically update RIB 222 to accurately reflect the topology of the network and the other network entities. Example protocols include routing and label switching protocols, such as BGP, ISIS, RSVP-TE and LDP. In some embodiments, network device 200 may be a mobile gateway having a distributed control plane for handling mobile subscribers, such as described within U.S. patent application Ser. No. 13/172,556, entitled "MOBILE GATEWAY HAVING DECENTRALIZED CONTROL PLANE FOR ANCHORING SUBSCRIBER SESSIONS," hereby incorporated herein by reference. In this case, as a mobile gateway, device 200 may have a plurality of session management cards, each handling control functions for a plurality of the subscriber sessions. Each of the session management cards may perform the deterministic NAT techniques described herein for the subscriber sessions assigned to the session management card.

Forwarding plane 212 receives and forwards packets associated with network packet flows 230. Forwarding component 228 maintains forwarding information base (FIB) 234 in accordance with RIB 222, which associates network destinations or MPLS labels with specific next hops and corresponding interface ports of output interface cards of network device 200. Routing engine 218 typically processes RIB 222 to perform route selection and generate FIB 234 based on selected routes. In this way, next hop information may be programmed into forwarding plane 212. Routing engine 218 may generate FIB 234 in the form of a radix tree having leaf nodes that represent destinations within the network. U.S. Pat. No. 7,184,437, the contents of which is incorporated herein by reference in its entirety, provides details on an exemplary embodiment of a router that utilizes a radix tree for route resolution.

When forwarding a packet, forwarding component 228 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 212 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this way, as shown in the example embodiment of FIG. 4, network device 200 integrates service plane 214 and routing plane 210 to utilize shared forwarding plane 212. Forwarding plane 212 may be a rich and dynamic shared forwarding plane, optionally distributed over a multi-chassis router. Moreover, forwarding plane 212 may be provided by dedicated forwarding integrated circuits normally associated with high-end routing components of a network router. Consequently, routing plane 210 and forwarding plane 212 may operate as a high-end router or gateway, and service plane 214 has been tightly integrated within network device 200 (e.g., by way of service cards 233) so as to use forwarding plane 212 of the routing components in a shared, cooperative manner. Further details of one example embodiment of network device 200 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Network services process (NSP) 243 of routing engine 46 communicates with and programs service cards 233 of service plane 214. For example, routing engine 218 may present a user interface (UI) 247 to receive configuration data from administrator 239 defining NAT rules 251. In response, NSP 243 programs services cards 233 with corresponding configuration data, causing the service cards of service plane 214 to perform the functions described herein when processing packets redirected from forwarding plane 212. One or more of service cards 233 may, for example, execute NAT controller (NAT CTRL) 259 that operates on packets for new subscriber communication flows to dynamically determine a public network address and port range as described herein, such as by the process described in reference to FIG. 2.

For example, forwarding plane 212 may include a flow control unit 275 to selectively direct packets of newly detected communication sessions to service plane 214 for processing. For example, flow control unit 275 receives incoming packet flows 230 (e.g., outbound subscriber traffic) and determines whether to send the packets through the service plane 214 for processing within one or more of service cards 233, or whether to bypass the service plane 214. Service cards 233 receive packets from flow control unit 275, computes NAT information as described herein to select a public network address and port for the communication flow, configures forwarding component 228 in accordance with the computed information and relays the packet or any response packets to forwarding plane 212 for forwarding by forwarding component 228 in accordance with FIB 234.

Service cards 233 within service plane 214 may be installed along a backplane or other interconnect of network device 200 to perform a variety of other services on the packets received from forwarding plane 212, such as filtering, logging, Intrusion Detection and Prevention (IDP) analysis, virus scanning, deep packet inspection. In some cases, service card 233 may issue commands 269 to dynamically configure a flow table within flow control unit 275 of forwarding plane 212. For example, when flow control unit 275 receives a packet and determines that the packet belongs to a new packet flow that does not match any of its filters, flow control unit 275 may send the packet to service cards 233 for processing and initial computation and assignment of a public address and port, as described for exemplary purposes with respect to FIGS. 1 and 2.

Upon receiving and processing the packet or packets of a packet flow, service cards 233 may issue a command 269 to install a dynamic filter within the flow table, such as an exact match filter that indicates particular actions to be performed when a packet is received that matches the filter. For example, upon processing an initial packet of a flow to compute the public network address and port, NAT controller 259 of service cards 233 may output commands 269 to program this information into forwarding component 228. In addition, NAT controller 259 may output commands 269 to install a filter within flow control unit 275 to specify that subsequent packets of this packet flow session may be processed on a straight path that bypasses service plane 214. When flow control unit 275 receives a subsequent packet of the same packet flow, flow control unit 275 checks the flow table, determines that the packet matches the new dynamic filter, and directs the packet on the appropriate path according to the dynamic filter. As such, subsequent inbound and outbound packets of the packet flow may be processed directly by forwarding component 228 for network address translation and network forwarding.

In one example embodiment, the user interface 247 provides a command line interface in which a syntax supports a new NAT translation-type keyword of "deterministic-napt44." When this translation type is configured in a NAT rule 251 by administrator 239, the deterministic NAT feature described herein is applied to traffic matching that rule.

In addition, a new "fallback-interface" keyword is introduced under service configuration. A fallback interface identifies one of removable service cards 233 to be used for communication sessions that cannot be handled by the deterministic NAT feature, e.g., traffic for sessions of subscribers who exceed their pre-computed port range.

A sample text-based configuration invoking the deterministic NAT feature is shown below:

```
root# show services
service-set ss-deterministic-nat {
    nat-rules det-nat-rule1;
    interface-service {
        service-interface si-5/0/0;
        fallback-interface sp-4/0/0;
    }
}
nat {
    pool det-nat-pool { //Primary pool
        address 20.20.20.0/24;
        port automatic;
    }
    pool fallback-pool { //Fall backpool
        address 30.30.30.0/24;
        port automatic;
    }
    rule det-nat-rule1 {
        match-direction input;
        term t1 {
            from {
                source-address {
                    10.60.1.0/16;
                }
            }
            then {
                translated {
                    source-pool det-nat-pool;
                    overload-pool fallback-pool;
                    translation-type {
                        source deterministic-napt44;
                    }
                }
            }
        }
    }
}
```

In addition, a "show" command may utilized to show inline services flows to which the deterministic NAT is being applied. The CLI show commands may be enhanced to show additional information specific to the deterministic NAT feature. For example, a new show command called "show services inline flows" shows flow information for inline flows, as follows:

user@MX240# run show services inline flows
Interface: si-1/0/0, Service set: idet-nat-sset
TCP 63.111.11.175:443→8.20.211.25:2882
NAT dest 8.20.211.25:2882→192.168.0.100:62983
Packets: 1000 Bytes: 15236
TCP 192.168.0.100:62983→63.111.11.175:443
NAT source 192.168.0.100:62983→8.20.211.25:2882
Packets: 10 Bytes: 1536

A "show services inline nat pool" command may be used to show port usage on per pool basis and any error counters (e.g., out of ports).

user@MX240# run show services inline nat pool
Interface: si-1/0/0, Service set: idet-nat-sset
NAT pool: p1, Translation type: BASIC NAT44
Address range: 20.0.0.0-20.0.0.5
Port range: 512-65535, Ports in use: 0, Out of port errors: 0
Max ports used: 0, NATed packets: 8, deNATed packets: 8

A "show services inline nat statistics" command may be used to show counters and errors specific to deterministic NAT. These counters are displayed on per si-interface level.

user@MX240# run show services inline nat statistics
Service PIC Name: si-1/0/0
Slow path packets received: 10
Slow path packets dropped: 0
Packets received: 0
Packets sent: 0
Flows created: 0
Flows deleted: 0
Active subscribers: 0
Flow insertion errors: 0
Flow deletion errors: 0
Out of port errors: 0
Subscribers with no free ports: 0

Another command may be used to display the private network address to public address and port block information for all the private addresses of all the deterministic NAT rules 251.

Another command may be used to display, given a private network address, the public address and port block currently assigned to that subscriber. If the private address appears in multiple deterministic NAT rules 251, all possible mappings may be displayed.

Another command may be used to display, given a public address and specific port, the corresponding private network address (i.e., the subscriber's network address).

In one embodiment, forwarding plane 212 maintains a subscriber table (not shown) to maintain per subscriber information upon detecting an initial flow from a new subscriber. Forwarding plane 212 creates a new subscriber entry when a subscriber is seen for the very first time. When all the subscriber sessions and NAT ports are released by NAT controller 259, the corresponding entry in the subscriber table is freed. In some embodiments, the subscriber table is implemented as a hash table having of a key of <private IP of subscriber, a NAT rule id>. The NAT rule id may be included to allow configurations where the same subscriber can be in the matching condition of multiple rules but pointing to different NAT pools. For example, one type of traffic from a subscriber can be configured to use one pool and a different type of traffic can be configured to use another NAT pool. In one embodiment, each entry of the subscriber hash table may contain the following information:

1. Number of ports allocated for this subscriber;
2. Low port number of the subscriber's NAT port range;
3. A pointer to a port bitmap; and
4. A flag indicating whether to direct subscriber's new sessions to the fallback service card. If the flow lookup fails on a packet, before NAT port allocation is attempted, forwarding plane 212 examines this bit and, if set, the packet is directed to the service card 233 that is designated as handling fallback/overflow condition.

In some embodiments, forwarding plane 212 (e.g., a processor or other forwarding component 228) computes the private address to public address mapping and user's public port range according to the deterministic NAT algorithm. In the alternative, this can also be pre-computed by NAT controller 259 as described above or NSP 243, which pass on this mapping to forwarding plane 212.

When flow lookup fails within the flow table, NAT controller 259 matches the packet against rules 251. At this point, NAT controller 259 needs to allocate NAT IP and port range for that session. NAT controller 259 performs a lookup on the subscriber hash table to see if a subscriber entry already exists in that table. If the subscriber entry doesn't exist, NAT controller 259 creates a new entry in the table. If the table is full, the session may be dropped and a counter is incremented. Once the subscriber's entry is picked, a search for a free bit from a port bitmap that is assigned to that subscriber is performed, where each bit of the bitmap corresponds to a port within the port range and indicates whether that port is currently in use. The NAT port corresponding to the first free bit is allocated. Once allocated, the corresponding port bit is set. At this point, both NAT IP and port are allocated for that subscriber and a flow entry is created in the flow table. In case there are no more NAT ports are available, the packet may be dropped and a counter is incremented. Similarly, if the flow table does not have a free entry then the packet may be dropped and corresponding counter is incremented. To process the reverse traffic, a reverse flow is also setup to map the public address and port to the private address and port. Both forward and reverse flows are linked together within the flow table. Once both the flows are setup, forwarding component 228 applies NAT to the packet and forwards the packet out a selected interface. Although described with respect to NAT controller 259, these functions may be performed entirely within flow control unit 75 of forwarding plane 212.

Once the first packet is processed, NAT bindings for forward and reverse traffic will be setup properly, and hence flow lookups for packets in that session will succeed. If the flow lookup succeeds, NAT or de-NAT action is performed using the existing NAT bindings and packet is forwarded.

For Deterministic NAT, no IP reassembly is necessarily required for fragments in the outbound direction (i.e., from private network to public side). This is because the first fragment contains port information and the flow lookup will succeed, if the flow exists. The NAT information in the flow can be used to NAPT that packet. If no flow is found, then a NAT address and port are allocated first, the flow is created and the packet is NAT-ed. For the rest of the fragments, the port information is not available. However, since private address to public address mapping is algorithmic, the public address can be computed on the fly and the packet can be NAT-ed as only the source address needs to be translated.

In the reverse direction, complete packet reassembly may be performed to reverse NAT the packet because a given public address may be shared between many subscribers. Fragments may be reassembled inline within forwarding plane 212 before the packet is deNATed.

Each flow record within the flow table may take the form of a 64-byte record. The hash key used Deterministic NAT may be a standard 5-tuple key (source address, source port, destination address, destination port, protocol) with a new application identifier for NAT. Both the forward and reverse flow records may be indexed by 5-tuple hash key.

The forward flow record may indexed by:
Hash-key=[Private src IP, Private src port, Dst address, Dst port, protocol, iif, App-type]. The flow record may contain the following fields:
1. NAT address
2. NAT port
3. Packet and byte counters
4. flow creation timestamp
5. last packet timestamp
6. Idle/inactivity timeout
7. Pointer/index to the reverse flow record
8. Translation type (forward or reverse)

For traffic in the reverse direction, the reverse flow record may be indexed by:
Hash-key=[Src IP, Src port, Dst address (NAT address), Dst port (NAT port), protocol, App-type]. The flow record may contain the following fields:
1. Private dst address
2. Private dst port
3. Packet and byte counters
4. last packet timestamp
5. Pointer/index to the flow record (might need for flow clean up purposes)
6. Translation type (forward or reverse)

For flow aging purposes, it is not required to have last packet timestamp in both forward and reverse flow records separately. Instead, one last packet timestamp for both forward and reverse flows may be sufficient. Each time a packet is received on either a forward flow or reverse flow, the common timestamp can be updated and that can be used to age both the flows at the same time.

As described, an overload pool may be used when a subscriber has used up all the public ports from his/her port range of the primary pool. This overload pool can contain completely different NAT addresses or same NAT addresses as the primary pool but with different/reserved port range.

The following provides example implementations of the Deterministic NAT algorithms described herein.

Consider the following configuration:

```
nat {
    pool det-nat-pool {
        address-range low 20.20.20.5 high 20.20.20.8;
        port automatic;   // port range is from 1024 to 65535
    }
    rule det-nat-rule1 {
        match-direction input;
        term t1 {
            from {
                source-address-range low 10.10.10.10 high 10.10.10.20;
            }
            then {
                translated {
                    source-pool det-nat-pool;
                    translation-type {
                        source deterministic-napt44;
                    }
                }
            }
        }
    }
}
```

In this example, we have the following:
No. of private addresses=11
No. of NAT IPs=4
No. of ports available per address=65535−1024+1=64512
No. of private addresses per NAT IP=No. of port blocks per NAT IP=roundup(11/4)=3
Size of each port block=64512/3=21504
No. of port blocks=No. of NAT IPs*No. of blocks per NAT IP=4*3=12. As we have only 11 subscribers, the 12$^{th}$ block will be unused.

Let us look at the NAT address and port range assignment with an example. When a packet from 10.10.10.16 is received:
Private address offset=10.10.10.16−10.10.10.10=6
NAT IP offset=Private address offset % No. of NAT IPs=6% 4=2
Port block offset=Private address offset/No. of NAT IPs=1
So, the NAT IP=20.20.20.5+2=20.20.20.7
1$^{st}$ port of port range=1024+(21504*1)=22528
Last port of port range=22528+(21504−1)=44031

Consider the following configuration, which is similar to previous example, but an explicit port range is configured in the NAT pool by the user.

```
nat {
    pool det-nat-pool {
        address-range low 20.20.20.5 high 20.20.20.8;
        port range low 10000 high 20000;
    }
```

```
rule det-nat-rule1 {
    match-direction input;
    term t1 {
        from {
            source-address-range low 10.10.10.10 high 10.10.10.20;
        }
        then {
            translated {
                source-pool det-nat-pool;
                translation-type {
                    source deterministic-napt44;
                }
            }
        }
    }
}
```

In this example,
No. of private addresses=11
No. of NAT IPs=4
No. of ports available per address=20000−10000+1=10001
No. of private addresses per NAT IP=No. of port blocks per NAT IP=roundup(11/4)=3
Size of each port block=10001/3=3333
No. of port blocks=No. of NAT IPs*No. of blocks per NAT IP=4*3=12. As we have only 11 subscribers, the $12^{th}$ block will be unused.

In addition, since 3333*3=9999, there will be a wastage of 10001−9999=2 ports per NAT IP. Unlike the previous example, here there are some ports that are unused for each IP address (over and above the $12^{th}$ block).

Consider the NAT address and port range assignment. When a packet from 10.10.10.16 is received, for example:
Private address offset=10.10.10.16−10.10.10.10=6
NAT IP offset=Private address offset % No. of NAT IPs=6% 4=2
Port block offset=Private address offset/No. of NAT IPs=1
So, the NAT IP=20.20.20.5+2=20.20.20.7
$1^{st}$ port of port range=10000+(3333*1)=13333
Last port of port range=13333+(3333−1)=16665

Consider the following configuration, where there are more NAT IP addresses than subscribers but each NAT IP address only has limited number of ports. This example is shown to highlight a corner case, but may or may not be practical.

```
nat {
    pool det-nat-pool {
        address-range low 20.20.20.5 high 20.20.20.10;
        port range low 5000 high 5009;
    }
    rule det-nat-rule1 {
        match-direction input;
        term t1 {
            from {
                source-address-range low 10.10.10.10 high 10.10.10.14;
            }
            then {
                translated {
                    source-pool det-nat-pool;
                    translation-type {
                        source deterministic-napt44;
                    }
                }
            }
        }
    }
}
```

In this example,
No. of private addresses=5
No. of NAT IPs=6
No. of ports available per address=5009−5000+1=10
No. of private addresses per NAT IP=No. of port blocks per NAT IP=roundup(5/6)=1
Size of each port block=10/1=10

In this example, there is 1:1 relation between NAT IP and private IPs, unlike previous examples where there is N:1 relationship. Also, each subscriber gets all ports of each NAT IP. No. of port blocks=No. of NAT IPs*No. of blocks per NAT IP=6*1=6. As there are only 5 subscribers, the $6^{th}$ block (and hence the $6^{th}$ NAT IP) will be unused. Out of 60 NAT ports, only 50 ports are usable. Consider the NAT address and port range assignment with an example. When a packet from 10.10.10.13 is received:
Private address offset=10.10.10.13−10.10.10.10=3
NAT IP offset=Private address offset % No. of NAT IPs=3% 6=3
Port block offset=Private address offset/No. of NAT IPs=3/6=0
So, the NAT IP=20.20.20.5+3=20.20.20.8
$1^{st}$ port of port range=5000+(10*0)=5000
Last port of port range=5000+(10−1)=5009
Next, consider the following configuration:

```
nat {
    pool det-nat-pool {
        address 20.20.20.0/24;
        address-range low 30.30.30.1 high 30.30.30.10;
        port automatic;
    }
    rule det-nat-rule1 {
        match-direction input;
        term t1 {
            from {
                source-address {
                    10.60.1.0/20;
                }
                source-address-range low 10.70.1.1 high 10.70.1.10;
            }
            then {
                translated {
                    source-pool det-nat-pool;
                    translation-type {
                        source deterministic-napt44;
                    }
                }
            }
        }
    }
}
```

In this example, an address range and address prefix are configured in the from clause and an address range and prefix are configured in the nat pool. In general, any number of prefixes and ranges can be configured (as long as the ddl constraints don't kick in). Given this, the following is computed:
No. of private addresses=(1<<(32−20))+(10.70.1.10−10.70.1.1+1)=4096+10=4106
No. of NAT IPs=(1<<(32−24))+(30.30.30.10−30.30.30.1+1)=256+10=266
No. of private addresses per NAT IP=No. of port blocks per NAT IP=roundup(4106/266)=16
Total number of port blocks=16*266=4256.
Size of port block=64512/16=4032.

As such, each subscriber is allocated 4032 ports. Note that per address 4032*16=64512, so in this example all 64512 ports are used. However, there are only 4106 subscribers where as 4256 port blocks are available. So, 4256−4106=150 port blocks (which is 604800 ports) will remain unused.

Once the port blocks have been computed, the port blocks are assigned to each subscriber. As discussed, in one example, the offset of the subscriber's private IP address from the 1$^{st}$ address of the private address space is computed. Even though the private address space can be non-contiguous (like in the above example), the addresses may be treated as contiguous for purposes of computing the offset. For example, when a packet is received from 10.70.1.5, the offset is computed as (1<<(32−20))+(10.70.1.5−10.70.1.1+1)−1=4096+5−1=4100. In this case:

Private address offset=4100
NAT IP offset=Private address offset % No. of NAT IPs=4100% 266=110
Port block offset=Private address offset/No. of NAT IPs=15

The 110$^{th}$ NAT address is selected (note that offset starts from 0 in this example) and the 15$^{th}$ block (offset starts from 0) of that NAT address. As such, in this example, the NAT address would be 20.20.20.110, the low end of port range would be 1024*+4032*15=60480 and the high end of the port range would be 60480+4032−1=64511. This subscriber's communication session will be assigned NAT address of 30.30.30.2 and a port from range [60480, 64511].

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, with a network device, a packet from a subscriber, wherein the packet includes a private source network address and source port;
selecting a network address translation (NAT) rule for the packet;
deterministically computing, with the network device, a public network address and a range of ports assigned to the private network address of the packet using the selected NAT rule by:
(i) computing an offset within a private address space for the NAT rule as a function of the private source network address,
(ii) computing an offset within a public address space for the NAT rule as a function of the offset within the private address space,
(iii) computing the public network address as a function of the offset within public network address,
(iv) computing a port block offset as a function of both the offset within the private address space and a number of public network addresses within the public address space, and
(v) computing the range of ports for the subscriber as a function of the port block offset and a port block size for the NAT rule,
dynamically selecting an unused port from the range of ports;
generating a translated packet from the packet, wherein the translated packet includes the computed public network address and the selected unused port from the range of ports in place of the private source address and source port; and
forwarding the translated packet from the network device to a public network.

2. The method of claim 1, further comprising:
logging an activation time period for the NAT rule without maintaining a log file that record network address translation of the private source network address to the public network address.

3. The method of claim 1, further comprising:
computing the private address space for the NAT rule by identifying a set of private address prefixes designated by the NAT rule and computing a total number of private addresses for the set of private address prefixes;
computing the public address space for the NAT rule by identifying a NAT pool designated by the NAT rule and computing a total number of public addresses for a set of public address prefixes of the NAT pool;
computing a number of the total number of private addresses for the NAT rule to be assigned to each of the public network addresses of the specified NAT pool based on the number of the total number of public addresses for the NAT rule and the total number of private addresses for the NAT rule; and
computing the port block size per each of the private addresses based on a number of ports available for each of the public addresses for the NAT pool and the total number of private addresses to be assigned to each of the public network address.

4. The method of claim 1, wherein dynamically selecting the unused port from the range of ports comprises:
maintaining a bitmap for the port range assigned to the private network address, wherein each bit within the bitmap indicates whether the corresponding port is being used for network address translation of a current communication session from the subscriber; and
based on the bitmap, selecting one of the ports within the port range that is not being used for a current communication session from the subscriber.

5. The method of claim 1, further comprising:
when all of the ports within the range of ports assigned to the private network address are currently being used, selecting the public network address and unused port from a fallback pool of public network addresses; and
generating and storing a system log file to record network address translation of the private source network address to the public network address.

6. The method of claim 1, wherein selecting a NAT rule comprise selecting the NAT rule upon matching one or more criteria of the NAT rule to contents of the packet.

7. The method of claim 1, wherein selecting a NAT rule comprise selecting the NAT rule upon matching the criteria of the NAT rule to the source the packet.

8. The method of claim 1, wherein the network device comprises a router or a mobile gateway.

9. The method of claim 3, further comprising:
prior to receiving the packet, programming NAT information within a forwarding component of the network device, wherein the NAT information comprises the total number of private addresses for the NAT rule, the total number of public network addresses for the NAT rule and the port block size for the NAT rule; and
algorithmically computing the public network address and the range of ports for the private network address of the packet with the forwarding component using the programmed NAT information.

10. A network device comprising:
a plurality of interfaces configured to send and receive packets for subscribers of a service provider network;
a control unit that provides a user interface for configuring at least one network address (NAT) rule;
a NAT controller that, upon receiving a packet for a new subscriber session, deterministically computes a public network address and a range of ports assigned to a private network address of a subscriber based on the NAT rule and selects an unused port from the range of ports, wherein the NAT controller deterministically computes the public network address and the range of port for the private network address by computing an offset within a private address space for the NAT rule as a function of the private source network address, computing an offset within a public address space for the NAT rule as a function of the offset within the private address space, and computing the public network address as a function of the offset within public network address, and wherein the NAT controller computes a port block offset as a function of both the offset within the private address space and a number of public network addresses within the public address space, and computes the range of ports for the subscriber as a function of the port block offset and a port block size for the NAT rule; and
a forwarding component to output a translated packet that includes the computed public network address and the selected unused port in place of the private source address and a source port of the packet.

11. The network device of claim 10,
wherein the NAT controller pre-computes NAT information for the NAT rule, the NAT information comprising a total number of private network addresses for the subscribers of the service provider network serviced by the NAT rule, a total number of public network addresses for a NAT pool associated with the NAT rule, and a port block size per each of the subscribers, and
wherein, upon receiving the packet for the new subscriber session, the NAT controller algorithmically computes the public network address and the range of ports assigned to a private network address of the packet based on the pre-computed NAT information.

12. The network device of claim 10, wherein the NAT controller pre-computes the NAT information by:
computing the private address space for the NAT rule by identifying a set of private address prefixes designated by the NAT rule and computing a total number of private addresses for the set of private address prefixes;
computing the public address space for the NAT rule by identifying a NAT pool designated by the NAT rule and computing a total number of public addresses for a set of public address prefixes of the NAT pool;
computing a number of the total number of private addresses for the NAT rule to be assigned to each of the public network addresses of the specified NAT pool based on the number of the total number of public addresses for the NAT rule and the total number of private addresses for the NAT rule; and
computing the port block size per each of the private addresses based on a number of ports available for each of the public addresses for the NAT pool and the total number of private addresses to be assigned to each of the public network address.

13. The network device of claim 10, wherein the NAT controller is configured to generate a system log file to store an activation time period for the NAT rule without recording network address translation of the private source network address to the public network address.

14. The network device of claim 10, further comprising a bitmap for the port range assigned to the private network address, wherein each bit within the bitmap indicates whether the corresponding port is being used for network address translation of a current communication session from the subscriber,
wherein, based on the bitmap, the NAT controller selects one of the ports within the port range that is not being used for a current communication session from the subscriber.

15. The network device of claim 10, further comprising:
a fallback pool of public network addresses,
wherein, when all of the ports within the range of ports assigned to the private network address are currently being used, the NAT controller selects the public network address and unused port from a fallback pool of public network addresses, and
wherein the NAT controller generates and stores a system log file to record network address translation of the private source network address to the public network address.

16. The network device of claim 10, wherein the NAT controller selects the NAT rule from a plurality of NAT rules upon matching one or more criteria of the NAT rule to contents of the packet.

17. The network device of claim 10, wherein the network device comprises a router or a mobile gateway.

18. A network router comprising:

a plurality of interfaces configured to send and receive packets for subscribers of a service provider network;

a routing engine comprising a control unit that executes a routing protocol to maintain routing information specifying routes through a network, wherein the control unit provides a user interface for configuring at least one network address (NAT) rule;

a forwarding component configured by the routing engine to select next hops for the packets in accordance with the routing information, the forwarding component comprising a switch fabric to forward the packets to the interfaces based on the selected next hops; and a NAT controller of the network router, the NAT controller, upon receiving a packet for a new subscriber session, deterministically computing a public network address and a range of ports assigned to a private network address of a subscriber based on the NAT rule, wherein the NAT controller deterministically computes the public network address and the range of port for the private network address by computing an offset within a private address space for the NAT rule as a function of the private source network address, computing an offset within a public address space for the NAT rule as a function of the offset within the private address space, and computing the public network address as a function of the offset within public network address, wherein the NAT controller computes a port block offset as a function of both the offset within the private address space and a number of public network addresses within the public address space, and computes the range of ports for the subscriber as a function of the port block offset and a port block size for the NAT rule, wherein the NAT controller dynamically selects an unused port from the range of ports and programs the forwarding component with the computed public network address and the unused port selected for the subscriber session; and wherein the forwarding component outputs a translated packet that includes the computed public network address and the selected unused port in place of the private source address and a source port of the packet.

19. The network router of claim 18, wherein the NAT controller pre-computes NAT information for the NAT rule prior to receiving the packet for the new subscriber session, the NAT information comprising a total number of private network addresses for the subscribers of the service provider network serviced by the NAT rule, a total number of public network addresses for a NAT pool associated with the NAT rule, and a port block size per each of the subscribers, and wherein, upon receiving the packet for the new subscriber session, the NAT controller algorithmically computes the public network address and the range of ports assigned to a private network address of the packet based on the pre-computed NAT information.

20. The network router of claim 18, wherein the forwarding component includes a flow control module that, upon receiving the packet for the new subscriber session, directs the packet to the NAT controller.

21. The network router of claim 18, wherein the NAT controller executes on a removable service card of the network router.

22. The network router of claim 18, wherein the user interface supports a syntax by which a user specifies the NAT rule and an a fallback pool of public network addresses, and wherein, when all of the ports within the range of ports assigned to the private network address are currently being used, the forwarding component selects the public network address and unused port from a fallback pool of public network addresses and generates a system log file to record network address translation of the private source network address to the public network address.

* * * * *